US00RE45873E

(19) United States
(12) Reissued Patent
Nyberg

(10) Patent Number: US RE45,873 E
(45) Date of Reissued Patent: Jan. 26, 2016

(54) SUBSCRIBER AUTHENTICATION

(71) Applicant: Nokia Corporation, Espoo (FI)

(72) Inventor: Kaisa Nyberg, Helsinki (FI)

(73) Assignee: Nokia Technologies Oy, Espoo (FI)

(21) Appl. No.: 14/700,536

(22) Filed: Apr. 30, 2015

Related U.S. Patent Documents

Reissue of:
(64) Patent No.: 8,503,676
Issued: Aug. 6, 2013
Appl. No.: 10/256,256
Filed: Sep. 27, 2002

U.S. Applications:
(63) Continuation of application No. PCT/FI01/00293, filed on Mar. 26, 2001.

(30) Foreign Application Priority Data

Mar. 30, 2000 (FI) ..... 20000732

(51) Int. Cl.
*H04L 29/06* (2006.01)
*H04W 12/06* (2009.01)
*H04W 12/02* (2009.01)

(52) U.S. Cl.
CPC ..... *H04W 12/06* (2013.01); *H04W 12/02* (2013.01)

(58) Field of Classification Search
None
See application file for complete search history.

(56) References Cited

U.S. PATENT DOCUMENTS 5,239,294 A * 8/1993 Flanders et al. ..... 340/5.74
5,455,863 A * 10/1995 Brown et al. ..... 380/247
5,557,654 A * 9/1996 Maenpaa ..... 455/411
5,557,676 A * 9/1996 Naslund et al. ..... 380/247
5,661,806 A 8/1997 Nevoux et al.
6,105,133 A * 8/2000 Fielder ..... H04L 9/0891 380/283
6,243,811 B1 * 6/2001 Patel ..... 713/167
6,338,140 B1 * 1/2002 Owens et al. ..... 713/168
6,373,949 B1 * 4/2002 Aura ..... 380/247
6,396,928 B1 * 5/2002 Zheng ..... H04L 9/3247 380/283
6,591,364 B1 * 7/2003 Patel ..... 713/170
6,711,400 B1 * 3/2004 Aura ..... 455/411
6,839,434 B1 * 1/2005 Mizikovsky ..... 380/247
6,865,673 B1 * 3/2005 Nessett et al. ..... 713/155
6,918,035 B1 * 7/2005 Patel ..... 713/169
7,007,164 B1 * 2/2006 Euchner ..... H04L 9/3297 380/284

(Continued)

FOREIGN PATENT DOCUMENTS

EP 977 452 2/2000
EP 982 965 3/2000

(Continued)

OTHER PUBLICATIONS

"HMAC", wikipedia.org, 2006, http://en.wikipedia.org/wiki/HMAC.*

(Continued)

*Primary Examiner* — Minh Dieu Nguyen
(74) *Attorney, Agent, or Firm* — Harrington & Smith

(57) ABSTRACT

To provide reliable and customized authentication, a parameter to be used in authentication is defined for the operator. A secret which may be stored e.g. in a subscriber identity module is calculated from the operator parameter and a subscriber key. An authentication response is calculated from the secret and the challenge to be used in authentication with a one-way function.

31 Claims, 2 Drawing Sheets

(56) References Cited

U.S. PATENT DOCUMENTS

| | | | | |
|---|---|---|---|---|
| 7,246,098 | B1 * | 7/2007 | Walmsley | B41J 2/17513 380/259 |
| 7,415,110 | B1 * | 8/2008 | Lee | H04L 9/3263 380/44 |
| 2002/0009199 | A1 * | 1/2002 | Ala-Laurila et al. | 380/247 |
| 2002/0012433 | A1 * | 1/2002 | Haverinen et al. | 380/247 |

FOREIGN PATENT DOCUMENTS

| | | |
|---|---|---|
| EP | 998 095 | 5/2000 |
| WO | WO 97/15161 | 4/1997 |
| WO | WO 98/49855 | * 11/1998 |
| WO | WO 98/49856 | * 11/1998 |
| WO | WO 99/25086 | 5/1999 |
| WO | WO9957689 | * 11/1999 |

OTHER PUBLICATIONS

Bellare, et al., "Keying Hash Functions for Message Authentication", Advances in Cryptology—Crypto 96 Proceedings, Lecture Notes in Computer Science vol. 1109, N. Kobiltz ed, Springer-Verlag, 1996.*

Mouly, et al., "GSM Ssytem for Mobile Communications", Europe Media, 1993, pp. 432-498 (*488 & 489).*

Krawczyk et al., "HMAC: Keyed-Hashing for Message Authentication", 1997, RFC 2104.*

The IEEE STandard Dictionary of Electrical and Electronics Terms, 6th ed., 1997, IEEE Standards Office, p. 192.*

* cited by examiner

SUBSCRIBER AUTHENTICATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

This application is *a reissue application of U.S. Pat. No. 8,503,676, granted Aug. 6, 2013, which is* a Continuation of International Application PCT/FI01/00293 filed Mar. 26, 2001 which designated the U.S. and was published under PCT Article 21(2) in English.

BACKGROUND OF THE INVENTION

The invention relates to an algorithm used in subscriber authentication in a mobile communication system, and particularly to an authentication response used in subscriber authentication.

The mobile communication system generally refers to any telecommunications system which enables wireless communication when users roam within the service area of the system. The public land mobile network PLMN is a typical example of a mobile communication system.

In mobile communication systems, mobile stations and the actual network usually communicate via radio paths. A radio path is physically open, which causes security risks and therefore both the users and the operator should be protected against intrusion by a third party, whether intrusion is unintentional or not. For example, illegal access to the network is prevented so that the network authenticates a mobile station when it registers with the network. The risk of eavesdropping is reduced by using encryption.

Authentication is a procedure in which one party authenticates the other party according to an agreed procedure. In the pan-European mobile communication system GSM (Global System for Mobile communications), for example, the algorithms to be used in authentication and the subscriber's key Ki are stored both in the subscriber identity module SIM and in the authentication center for authentication. In the GSM system the authentication response SRES to be used in authentication is calculated using algorithm A3 and the key Ks to be used in encryption of the information to be transmitted over the radio path with algorithm A8. Typically these algorithms are combined so that both the authentication response SRES and the encryption key Kc are calculated during authentication. Algorithms A3 and A8 are operator-specific, proprietary and typically secret. The random number generator in the authentication center generates a challenge RAND which is transmitted to a mobile station over the radio path during authentication. The challenge RAND and the subscriber key Ki are used for calculating the authentication response SRES and the encryption key Kc both in the authentication center and in the mobile station. During authentication the mobile station sends the authentication response SRES calculated by it back to the network where it is compared with the authentication response calculated by the authentication center. If the responses are identical, the mobile station passes authentication, after which the information to be transmitted on the radio path is usually encrypted with an encryption key Kc.

The problem related to the authentication procedure described above is that operator-specific customization is not possible. Neither can the algorithms be revealed to different operators, for example, without at the same time giving the operator a chance of interfering with the authentication system of another operator. Thus the security of the system cannot be guaranteed, either.

BRIEF DESCRIPTION OF THE INVENTION

The object of the invention is to provide a method and an apparatus implementing the method to eliminate the above-mentioned problems. The objects of the invention are achieved with the methods, systems, authentication centers and subscriber identity modules which are characterized by what is disclosed in the independent claims. The preferred embodiments of the invention are disclosed in the dependent claims.

The invention is based on the idea that a parameter is defined for an operator and secret information is calculated from the subscriber key Ki and the operator parameter with a one-way function. The secret information and a challenge (public information) are used to calculate at least an authentication response with a one-way function, but the encryption key Kc can also be calculated at the same time, if desired. 'Key' is a general term for encrypted information, i.e. a secret. An advantage of the invention is that it enables operator-specific customization of authentication. A further advantage is that the security of the invention is not based on a secret algorithm but on a secret key, and thus the algorithm can be revealed to the operators.

In a preferred embodiment of the invention a secret (or secrets) calculated from the subscriber key and the operator parameter are stored in the subscriber identity module. An advantage of this embodiment is that calculation of the authentication response can be implemented easily in the subscriber identity module. Authentication will also become quicker when pre-calculated information is used. A further advantage of this embodiment is that the operator parameter cannot be derived even though the information included in the identity module could be decoded.

BRIEF DESCRIPTION OF THE DRAWINGS

The invention will be described in greater detail by means of preferred embodiments with reference to the accompanying drawings, in which.

DETAILED DESCRIPTION OF THE INVENTION

The present invention is applicable to any telecommunications system where the subscriber is authenticated. These include the GSM system, its next generation, known as GSM 2+, and similar systems, such as the PCS (Personal Communication System) and DCS 1800 (Digital Cellular System for 1800 MHz). The invention is also applicable in the third generation mobile communication systems, such as the UMTS (Universal Mobile Telecommunications System) and IS-41 (Interim Standard). In the following the invention will be described using the GSM system as an example without limiting the invention to this particular system.

Figure 1:
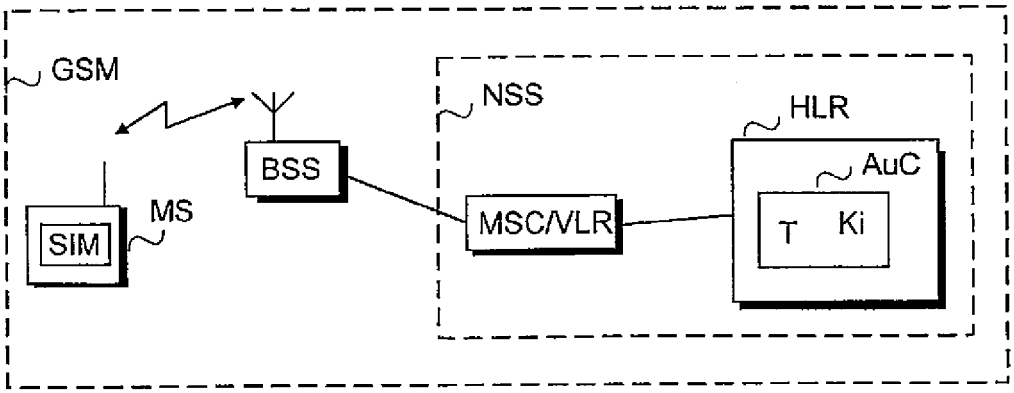
FIG. 1, illustrates the network architecture of the GSM system.

FIG. 1 illustrates the network architecture of the GSM system at a general level because a more detailed structure of the system is not relevant to the invention.

The structure of a network GSM according to the GSM system 1 consists of two parts: a base station subsystem BSS and a network subsystem NSS. The BSS and mobile stations MS communicate via radio connections. The base station subsystem is connected to a mobile switching center MSC of the network subsystem NSS. The function of the mobile switching center is to switch calls involving at least one mobile station MS. Some mobile switching centers are connected to other telecommunications networks, such as the PSTN (Public Switched Telephone Network) and they comprise switching functions for switching calls to and from these networks. These mobile switching centers are called gateway centers.

The network subsystem NSS comprises two types of databases. Subscriber information on all subscribers of the network is stored permanently or semipermanently in a home location register HLR, the subscriber information being connected to the subscriber's identifier IMSI. The other type of register is a visitor location register VLR. When a mobile station MS is active (is registered in the network and can make or receive calls), most of the subscriber information on the mobile station MS included in the borne location register HLR is loaded (copied) into the visitor location register of the mobile switching center MSC in the area of which the mobile station MS is. In fact, the mobile switching center MSC and the visitor location register VLR are the central network elements in respect of mobility management, controlling and signalling.

The network subsystem also comprises an authentication Center AuC. The authentication center AuC is typically part of the subscriber's home location register HLR. The authentication center AuC comprises a random number generator (not shown) for generating challenges, i.e. random number parameters RAND. The authentication center also has memory for storing authentication information on the subscriber and authentication algorithms. The subscriber's authentication information to be stored according to the first and second preferred embodiment of the invention includes a subscriber key Ki and an operator parameter T. If the operator has more than one parameter, the authentication center can combine the subscriber key Ki with the parameter of the correct operator e.g. by storing the operator parameter or an identifier identifying the operator parameter into the subscriber information. The authentication center preferably calculates an authentication response SRES and an encryption key from the subscriber key, operator parameter and random number using one of the authentication algorithms shown in FIGS. 2, 3 and 4 and forms 'authentication triplets', i.e. entities consisting of the random number RAND, authentication response SRES and encryption key Kc. The operator parameter is preferably a binary parameter which consists of the operator's identifier and the operator's secret. The operator parameter does not need to be secret. The operator parameter T is described in greater detail in connection with FIG. 2.

In this application 'mobile station' MS generally refers to the entity formed by the mobile subscriber and the actual terminal. The terminal may be any device that can communicate in a mobile communication system or a combination of several devices, e.g. a multimedia computer equipped with a card phone produced by Nokia to provide mobile connection. The subscriber is identified from the subscriber identity module SIM detachably connected to the terminal. The SIM is a smart cart which is inserted into the mobile station and includes information related to identification of the subscriber, such as an international mobile subscriber identity IMSI, and means for authenticating the subscriber. In other words, the SIM includes the algorithms and secrets needed in authentication. Typically the SIM also comprises a temporary mobile subscriber identity of the location area TMSI by means of which transmission of the IMSI over the radio path can be avoided.

The telecommunications system, authentication center and mobile station implementing the functionality according to the present invention include, in addition to the prior art devices needed in authentication, means for taking the operator parameter into account in authentication. Existing network nodes comprise processors and memory that can be utilized in the functions according to the invention. All the changes needed to implement the invention can be carried out by means of added or updated software routines and/or application circuits (ASIC). The mobile station and/or the authentication center may also require additional memory.

Figure 2:
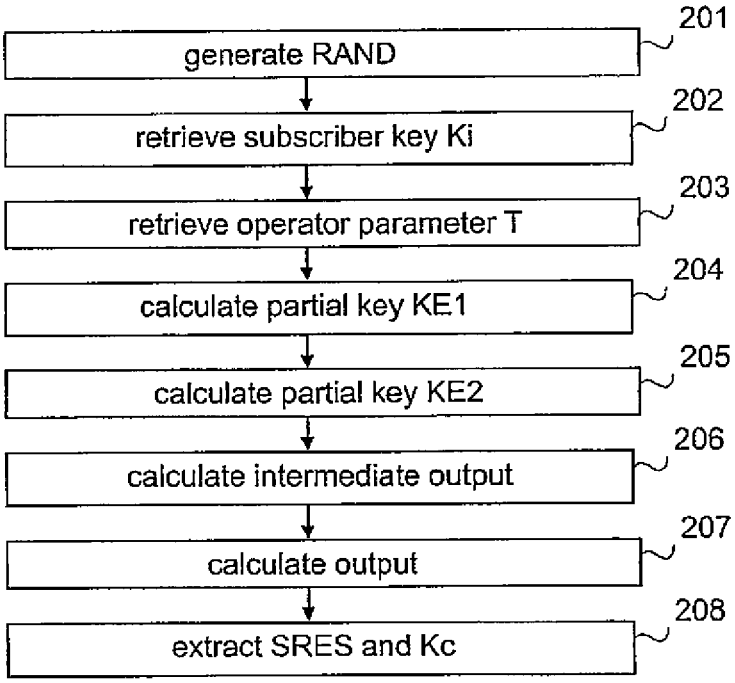
FIG. 2 is a flow chart of an authentication algorithm according to a first preferred embodiment of the invention.

FIG. 2 shows algorithm A3/A8 which is used in the first preferred embodiment of the invention and in which two different algorithms are combined, as is usual in the GSM system. For the algorithm of the invention it is necessary to define at least one operator parameter T and a separate key Ki for each subscriber. The subscriber-specific key Ki is defined according to the prior art and its length is 128 bits according to the GSM standard. In the first preferred embodiment of the invention the algorithm consists of two different encryption functions which are well known to the persons skilled in the art: the internationally standardized hash function RIPEMD-128 and the encryption algorithm in accordance with the DES standard (Data Encryption Standard). This allows to combine the best properties of these functions. The algorithm used in the first preferred embodiment of the invention is thus one of the message authentication codes MAC. Hash algorithms are inherently non-reversible and numerically efficient. The encryption algorithms, on the other hand, are better suited for smart cards most of which support the DES algorithm. The encryption algorithm is a one-way function when secret input is used as the key of the encryption algorithm. By utilizing widely used and tested one-way functions we can ensure that the security requirements set for the network are fulfilled. Openness allows to ensure that the algorithm does not contain intentional trapdoors or other weaknesses. Breaking the algorithm completely, i.e. finding out the operator parameters and subscriber keys by analysing the algorithm is highly unlikely because this would require breaking of the corresponding international standards.

In the first preferred embodiment the operator parameter T is a 384-bit parameter consisting of the operator's code CC and the operator's secret CS. In other words, T is CC||CS. It should still be emphasized that the following is only one example of defining the operator parameter. The invention does not in any way restrict the manner of defining the operator parameter.

The operator code CC is, in the first preferred embodiment of the invention, a 128-bit hash code which is obtained e.g. with the hash function RIPEMD-128 from the following text when 27 X's are replaced e.g. with the operator's name and empty spaces, after which the text is coded with AS-CII: NOKIA NETWORKS GSM A3A8 FOR XXXXXXXXXXXXXXXXXXXXXXXXXXX. Thus different operators have different parameters. The same operator may also have several parameters if the operator adds different letters or numbers to the end of his name. The different value of even one X yields a different operator code CC.

The operator secret CS is, in the first preferred embodiment of the invention, a string consisting of 256 bits. The operator may select this string freely. It is, however, recommendable to generate a unique value for the operator secret so that it is unpredictable. This allows to ensure that the operators' values differ from one another considerably. The value of the operator parameter may also be a string of zeroes when the operator parameter is not intended to be secret. One operator may have several different secrets CS and thus different operator parameters.

In the authentication algorithm according to the first preferred embodiment of the invention a random number, the length of which is 128 bits according to the GSM standard, is generated into a challenge RAND in step 201. The subscriber key Ki is retrieved in step 202 and the operator parameter T in step 203. The sub-value is also called partial key. In steps 203 and 204 we calculate sub-values KE1 and KE2 for an extended key. Each sub-value consists of 128 bits. The sub-vales are calculated independently from the operator parameter T and the subscriber key Ki. To calculate the sub-value the operator parameter T and the subscriber key Ki are masked and after masking a sub-value is calculated from them using a hash function RIPEMD-128 with one round. In the calculating a standard initial value is used but padding and length appending are not performed because the input has a standard length. The sub-value KE1 is calculated using a mask IPAD which is a string consisting of 64 octets 00110110. The sub-value KE2 is calculated using a mask OPAD which is a string consisting of 64 octets 01011100.After the sub-values KE1 and KE2 have been calculated, a 128-bit intermediate output is calculated from the sub-value KE1 and the challenge RAND in step 206 using a three-round Feistel network F where the DES algorithm serves as the round function. The calculation will be described in greater detail below. In step 207 a 128-bit output is calculated from the sub-value KE2 and the intermediate result using a three-round Feistel network F where the DES algorithm serves as the round function. 32 left-most bits are extracted from the output to form an authentication response SRES and the next 64 bits are used to form an encryption key Kc in step 208.

The calculation described above can be expressed by the following formula according to the HMAC standard (keyed-hashing for message authentication):

$$H((\{Ki\|T\}\oplus OPAD)\|H((\{Ki\|T\}\oplus IPAD)\|RAND)),$$

where a novel proprietary hash function H of the invention is obtained by combining the standardized RIPEMD-128 and the three-round Feistel network by means of a key-scheduling operation to be described below. Key-scheduling refers to the manner in which the algorithm utilizes the key parameter. In most cases more than one partial key is derived which are used in different phases of the algorithm calculation.

The three-round Feistel network F receives two inputs which in the first preferred embodiment of the invention are a 128-bit key KEj and a 128-bit data input DIj. A 128-bit output DOj (DOj=F(KEj; DIj)) is calculated in two phases.

In the first phase we perform key scheduling. In the first preferred embodiment of the invention three 64-bit DES keys are derived from the key KEj in a new manner. First the key KEj is divided into 16 octets KEJ[0] . . . KEj[15]. These octets are converted into 32 octets Mj[0] . . . Mj[31] as follows:

| | |
|---|---|
| Mj[k] = KEj[k], | k = 0, . . . , 15; |
| Mj[k] = KEj[(k − 10) mod 8], | k = 16, . . . , 23; |
| Mj[k] = KEj[((k − 20) mod 8) + 8], | k = 24, . . . , 31. |

Thus each octet of the key KEj occurs twice in array Mj in the following order:

| | | | | | | | |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 6 | 7 | 0 | 1 | 2 | 3 | 4 | 5 |
| 12 | 13 | 14 | 15 | 8 | 9 | 10 | 11 |

The first 64-bit DES key Kj1 is obtained by changing the halves of each octet in the first row and by performing an XOR operation on the octets obtained in the change and on the octets of the second row. The key of the second round is obtained by repeating the same procedure on the octets of the second and the third row. Correspondingly, the third key is obtained by repeating the procedure on the octets of the third and the fourth row. Derivation of the DES keys Kj1, Kj2 and Kj3 from the array Mj[0, 1, . . . 31] can be expressed as follows:

$$Kjr[n]=(swap\ Mj[n+8(r-1)])\oplus Mj[n+8r],\ n=0,\ldots,7;\quad r=1,2,3,;$$

where 'swap' changes the halves of the octet B=B[0, . . . , 7] as follows:

$$swap\ B-B[4,5,6,7,0,1,2,3].$$

In the second phase the data input DIj[0 . . . 127] is divided into two parts, i.e. a left part DIjL=DIj[0 ... 63] and a right part DIjR−DIj[64 . . . . 127]. The 128-bit output is generated in two parts, a left output part DOjL=[0 . . . 63] and a right output part DOjR=DOj[64 . . . 127], as follows:

$$DOjR=DIjL\oplus DES(Kj2;DIjR\oplus DES(Kj1;DIjL))$$

$$DOjL=DIjR\oplus DES(Kj1;DIjL)\oplus DES(Kj3;DOjR).$$

In step 206 of FIG. 2 the challenge formed by the random number is used as the data input and in step 207 of FIG. 2 the intermediate output DO1. Steps 206 and 207 can be expressed by the following formulae:

$$DI2=DO1=F(KE1;RAND),(step\ 206)$$

$$DO2=F(KE2;DI2)=F(KE2;F(KE1;RAND))(step\ 207).$$

The algorithm according to the first preferred embodiment of the invention can be utilized in two ways: in a pre-calculated mode and in a direct mode. In the pre-calculated mode the partial keys KE1 and KE2 are calculated in advance (i.e. steps 202 to 205 have been carried out) and stored. In the pre-calculated mode steps 206 to 208 are carried out during authentication in addition challenge generation. When the above-mentioned Feistel network F with DES rounds is used in steps 206 to 208, the algorithm to be carried out during the actual authentication in the pre-calculated mode is the same as the 128-bit DES algorithm DEAL.

Figure 3:
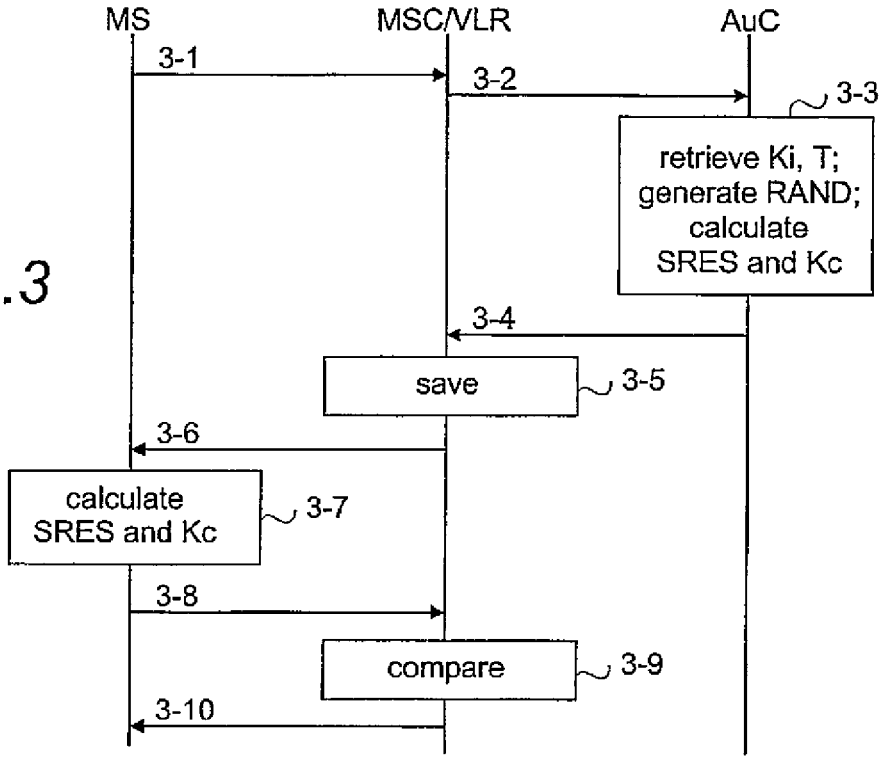
FIG. 3 illustrates signalling according to a first preferred embodiment of the invention.

FIG. 3 illustrates authentication according to the first preferred embodiment of the invention as the mobile station registers in the network. The first preferred embodiment of the invention utilizes the algorithm described in connection with FIG. 2 as such in the authentication center AuC and in the pre-calculated mode in the subscriber identity module SIM. This means that in addition to the whole algorithm, the subscriber key Ki and the operator parameter T are stored in the authentication center, whereas only part of the algorithm and partial keys KE1 and KE2 of the extended key are stored in the subscriber identity module SIM. The partial keys are treated and secured in the same way as the subscriber key Ki. In the example of FIG. 3 it is assumed, for the sake of clarity, that the mobile switching center and the visitor location register are integrated into the same unit MSC/VLR.

At the beginning of authentication the mobile station MS transmits the identification data on the basis of which the SIM and the subscriber are identified to the mobile switching center MSC/VLR in message 3-1. Usually identification information is the IMSI or the TMSI. The mobile switching center MSC/VLR sends an authentication request to the authentication center AuC in message 3-2. The message 3-2 includes the subscriber identity IMSI. The visitor location register can change the TMSI into an IMSI. In step 3-3 the authentication center AuC selects a subscriber-specific authentication key Ki and the operator parameter T on the basis of the subscriber identity IMSI included in the authentication request. The authentication center AuC calculates the partial keys KE1 and KE2 from the operator parameter T and the subscriber key Ki as described in connection with FIG. 2. Furthermore, the random number generator generates e.g. five random number parameters RAND into challenges. A check parameter SRES and an encryption key Kc is formed of each challenge with the partial keys KE1 and KE2 as was described in connection with FIG. 2. In other words, when more than one authentication triplet is calculated at a time, it is sufficient to calculate only the partial keys KE1 and KE2 with the first triplet and then store the partial keys transiently into the memory for the calculation of the following triplets. The authentication center AuC transmits the five authentication triplets RAND, SRES, Kc so calculated in message 3-4 to the visitor location register MSC/VLR where they are stored in step 3-5.

The visitor location register MSC/VLR selects an RAND value for the parameter from the subscriber's RAND/SRES/Kc table and sends it to the mobile station MS in message 3-6 and further to the subscriber identity module SIM. In the first preferred embodiment of the invention the SIM comprises partial keys KE1 and KE2 which have been calculated from the subscriber key Ki and the operator parameter T. The SIM also comprises steps 206 to 208 of the authentication algorithm A3 shown in FIG. 2. In step 3-7 the SIM calculates the SRES parameter and the encryption key Kc by means of the received RAND parameter and keys KE1 and KE2 utilizing the Feistel network F with DES rounds as was described above. The mobile station sends the SRES parameter back to the visitor location register MSC/VLR. In step 3-9 the visitor location register MSC/VLR compares the SRES value sent by the mobile station with the stored SRES value and informs the mobile station MS whether or not the authentication was successful in message 3-10. If the SRES value sent by the mobile station is the same as the stored SRES value, authentication has succeeded and encryption with the encryption key Kc can be started on the radio path.

When the visitor location register VLR is to authenticate the subscriber for the next time, it selects the next value for the parameter RAND from the subscriber's RAND/SRES/Kc table and transmits it to the mobile station and further to the subscriber identity module SIM.

The fact that the first preferred embodiment of the invention utilizes the pre-calculated mode of the algorithm of the invention in the subscriber identity module SIM and the direct form of the algorithm in the authentication center provides the advantage that the best features of both one-way functions can be combined and optimal performance and security guaranteed in a customized manner. The RIPEMD-128 is a considerably efficient one-way function but the 8-bit processor used by the subscriber identity module SIM does not do justice to it. The DES is not as efficient as the RIPEMD-128, but it is known best and it can also be implemented safely and efficiently in the subscriber identity module SIM.

Every time the authentication center AuC uses the operator parameter T in the network, it also checks that the partial keys KE1 and KE2 included in the subscriber identity module SIM have really been derived using the operator parameter in question. Usually one operator uses several subscriber identity module SIM producers, who also form the subscriber keys Ki themselves. The operator probably also gives them the operator parameter for forming partial keys KE1 and KE2. The operator can give a different operator parameter to each producer e.g. by using a producer-specific secret part CS and/or changing the operator's name in the operator code CC. The operator can also form the subscriber keys Ki and the related partial keys KE1 and KE2 himself and give them to the producer of the subscriber identity module SIM so that they can be stored in the identity module.

The one-way functions, masks and key scheduling described above are only intended to describe how the invention can be implemented and do not in any way limit the invention. The masks and key scheduling described above are only examples and not even necessary. It is also possible to use other one-way functions which need not be public functions. Furthermore, the same one-way function can be used in each phase. On the other hand, different functions can be used in every phase so that the same function is never used twice for calculations. In addition, the first function can be used once and the second function three times, for example.

In other preferred embodiments of the invention the pre-calculated mode can be employed in the authentication center AuC, too. In that case partial keys KE1 and KE2 have to be stored in the authentication center AuC for the subscriber. On the other hand, the direct form can be used in the subscriber identity module SIM, in which case the whole algorithm, subscriber key Ki and operator parameter T are stored in the subscriber identity module, but not the partial keys KE1 and KE2.

Figure 4:
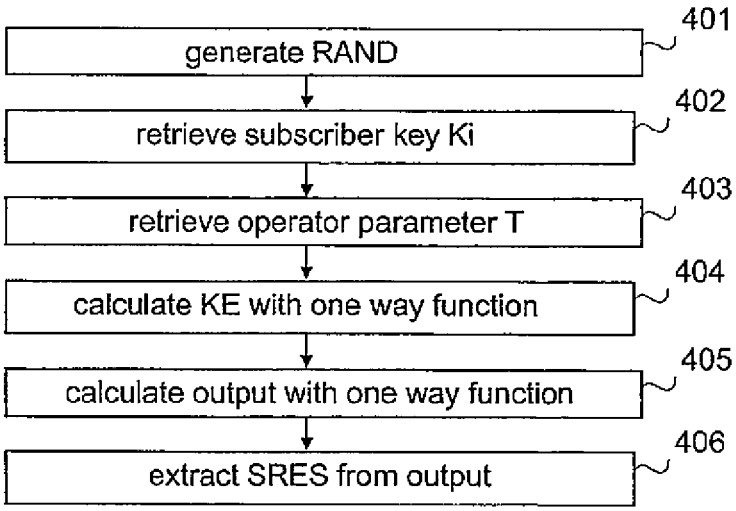
FIG. 4 is a flow chart of an authentication algorithm according to a second preferred embodiment of the invention.

FIG. 4 illustrates a second preferred embodiment of the invention. Here the algorithm according to the invention is described at its simplest without any detailed descriptions of functions and comments on the length of the outputs and inputs. The subscriber key Ki and the operator parameter T are defined in the second preferred embodiment of the invention, too.

The algorithm according to the second preferred embodiment of the invention begins with generation of a challenge RAND in step 401. The subscriber key Ki is retrieved in step 402 and the operator parameter T instep 403. Thereafter a key KE is calculated from the subscriber key Ki and the operator parameter T in step 404 with a one-way function. In step 405 an output is calculated from the key KE and the challenge RAND with a one-way function and an authentication response SRES is extracted from the output in step 406.

Calculation according to the second preferred embodiment of the invention can be expressed by the following formula:

$$H2(H1(Ki||T)||RAND)$$

In the second preferred embodiment of the invention it is possible to use the same one-way functions, e.g. RIPEMD-128 functions. Two different one-way functions can also be used, e.g. the RIPEMD-128 function in step 404 and a six-round Feistel network where the DES serves as a round function in step 405 as was explained in connection with FIG. 2.

The second preferred embodiment can also be applied in the pre-calculated mode and the direct mode. In the pre-calculated mode the key KE is calculated in advance and stored e.g. in the subscriber identity module SIM.

The steps illustrated in FIGS. 2, 3 and 4 are not in an absolute chronological order and some of the steps can be performed simultaneously or in a different order from what has been shown. Furthermore, some other functions may take place between the steps. On the other hand, some steps may be omitted. What is important is that the operator parameter is also used as the input in the authentication. The signalling messages described above in connection with FIG. 3 are only referential and may contain several separate messages for transmitting the same information. The messages may also contain other kind of information. Depending on the operator and the system, other network elements between which different functionalities have been divided can also take part in the data transmission and signalling. Furthermore, it is possible that the subscriber identity module is arranged to generate a challenge and send it to the authentication center in connection with authentication.

Even though the invention has been described above in connection with mobile communication systems, the authentication algorithm of the invention can be applied in fixed networks, too, where the subscriber is authenticated by means of the identity module.

It should be understood that the preceding specification and the related drawings are only intended to illustrate the present invention. It will be obvious to a person skilled in the art that the invention may be varied and modified without deviating from the scope and spirit of the invention defined in the appended claims.

The invention claimed is:

1. A method, comprising:

*providing a first secret calculated* using a first one-way function [to calculate a first secret] from only two inputs comprising a predefined key and a predefined operator parameter, wherein the key is predefined for a subscriber and the operator parameter is predefined as an operator-specific parameter having a value selected by an operator associated with the subscriber;

using a second one-way function to calculate an output from only two different inputs, the two different inputs comprising a challenge and the [calculated] *provided* first secret, wherein the challenge comprises a generated random number;

extracting [the] *an* authentication response from the output calculated by the second one-way function; and authenticating the subscriber with the extracted authentication response, wherein the first and second one-way functions are configured to each receive exactly two inputs.

2. The method of claim 1, *where the first secret is stored in a subscriber identity module, and* further comprising:

[storing the calculated first secret in a subscriber identity module; and]

calculating the output in the subscriber [identify] *identity* module with the second one-way function using the challenge and the stored first secret as the two inputs.

3. The method of claim 1, wherein the first one-way function is a hash function and the second one-way function is an encryption algorithm.

4. A method, comprising:

*providing a first secret calculated* using a first one-way function [to calculate a first secret] from two inputs comprising a predefined key and a predefined operator parameter wherein the predefined key is determined for a subscriber and the operator parameter is predefined as an operator-specific parameter having a value selected by an operator associated with the subscriber;

using a second one-way function to calculate a second secret from said two inputs;

calculating, with a third one-way function, an intermediate output from two different inputs, the two different inputs comprising a challenge and the *provided* first secret, wherein the challenge comprises a random number;

calculating, with a fourth one-way function, an output from two additional inputs, the two additional inputs comprising the intermediate output and the second secret;

forming an authentication response by extracting the authentication response from the output; and authenticating the subscriber with the authentication response, wherein each of the first, second, third, and fourth one-way functions is configured to only receive exactly two inputs, and wherein a new challenge is required in subsequent authentications of the subscriber while the predefined key and the predefined operator parameter are allowed to be reused in the subsequent authentications of the subscriber.

5. The method of claim 4, further comprising:

masking the predefined key and the operator parameter with a first mask before the first secret is calculated;

calculating the first secret using, as the two inputs for the first one-way function, the predefined key and the operator parameter masked with the first mask:

masking the predefined key and the operator parameter with a second mask before calculating the second secret; and calculating the second secret using, as the two inputs for the second one-way function, the predefined key and the operator parameter masked with the second mask.

6. The method of claim 4 *where the first secret is stored in a subscriber identity module, and* further comprising:

storing the [first and the] second secret in a subscriber identity module; and calculating, with the third one-way function, the intermediate output in the subscriber identity module using the challenge and the stored first secret as the two inputs; and calculating, with the fourth one-way function, the output using the intermediate output and the stored second secret as said two additional inputs.

7. The method of claim 4 wherein the first and the second one-way functions comprise hash functions, and the third and the fourth one-way functions comprise encryption algorithms.

8. The method of claim 3 wherein the hash function comprises an RIPEMD-128 function; and the encryption algorithm utilizes a DES algorithm.

9. The method of claim 1 wherein the operator parameter of the subscriber's operator comprises an operator code identifying the operator and an operator secret.

10. The method of claim 1, further comprising extracting an encryption key from the output in addition to extracting said authentication response.

11. A telecommunications system comprising:

a subscriber identity module;

an authentication center; and a processor configured to use a challenge comprising a generated random number in authentication and to authenticate a subscriber by comparing an authentication response calculated by the subscriber identity module with an authentication response calculated by the authentication center, wherein at least one operator parameter is predefined as an operator-specific parameter, a value of which has been selected by an operator associated with the subscriber;

wherein the authentication center is configured to:

store authentication information relating to the subscriber, the authentication information comprising at least a subscriber key defined for the subscriber and the operator parameter;

calculate, with a first one-way function, a first secret using only two inputs, the two inputs used by the first one-way function being the subscriber key and the operator parameter;

calculate, with a second one-way function, an output from only two different inputs, the two different inputs used by the second one-way function being the first secret calculated with the first one way function and the challenge; and extract [an] *the* authentication response from the output;

wherein the subscriber identity module is configured to:

store the first secret therein, calculate an output using the first secret and the challenge as the two inputs for the second one-way function, and extract an authentication response from the output.

12. A telecommunications system comprising a subscriber [identify] *identity* module;

an authentication center; and a processor configured to:

use a challenge comprising a generated random number; and authenticate a subscriber by comparing an authentication response calculated by the subscriber identity module with an authentication response calculated by the authentication center;

wherein at least one operator parameter is predefined as an operator-specific parameter, a value of which has been selected by an operator of the subscriber;

wherein the authentication center is configured to:

store authentication information on the subscriber, the authentication information including at least a subscriber key; and the operator parameter;

calculate, with a first one-way function, a first secret from only two inputs, the two inputs for the first one-way function being the subscriber key and the operator parameter;

calculate, with a second one-way function, a second secret from said two inputs, calculate, with a third one-way function, an intermediate output from only two different inputs, the two different inputs for the third one-way function being the first secret calculated with the first one-way function and the challenge;

calculate, with a fourth one-way function, an output from only two other inputs, the two other inputs for the fourth one-way function being the second secret and the intermediate output; and extract [an] *the* authentication response from the output;

wherein the subscriber identity module comprises a first and a second secret and is configured to:

calculate an intermediate output with the third one-way function;

calculate an output from the second secret and the intermediate output with the fourth one-way function; and extract [an] *the* authentication response from the output.

13. An authentication center, the authentication center comprising:

a memory configured to store a subscriber key defined for a subscriber and an operator parameter defined for an operator of the subscriber, the operator parameter being an operator-specific parameter, a value of which has been selected by the operator;

a random number generator that generates challenges; and a processor configured to:

calculate, with a first one-way function, a first secret from only two inputs comprising the stored subscriber key and the stored operator parameter;

calculate, with a second one-way function, an output from only two different inputs comprising the first secret and a challenge generated by the random number generator; and extract, from the output, an authentication response to be used in authentication.

14. Au authentication center, comprising:

a memory configured to store a first secret calculated with a first one-way function using only two inputs which are a subscriber key defined for a subscriber and an operator parameter defined for an operator of the subscriber, the operator parameter being an operator-specific parameter, value of which has been selected by the operator;

a random number generator for generating challenges; and a processor configured to:

calculate an output using a second one-way function having only two different inputs comprising the stored first secret and a challenge generated by the random number generator; and extract, from the output, an authentication response to be used in authentication.

15. An authentication center, comprising:

a memory configured to store a subscriber key defined for a subscriber and an operator parameter defined for an operator associated with the subscriber, the operator parameter being an operator-specific parameter, a value of which has been selected by the operator;

a random number generator that generates challenges; and a processor configured to:

calculate, with a first one-way function, a first secret from only two inputs comprising the stored subscriber key and the stored operator parameter;

calculate, with a second-way function, a second secret using said two inputs;

calculate, with a third one-way function, an intermediate output from only two different inputs comprising the first secret and a challenge generated by the random number generator;

calculate, with a fourth one-way function, an output from only two other inputs comprising the second secret and the intermediate output; and extract an authentication response from the output.

16. An authentication center, comprising:

a memory configured to store a first secret calculated with a first one-way function from only two inputs comprising a subscriber key defined for a subscriber and an operator parameter defined for an operator associated with the subscriber, the operator parameter being an operator-specific parameter, a value of which has been selected by the operator and a second secret calculated with a second one-way function using said two inputs;

a random number generator that generates challenges; and a processor configured to:

calculate, with a third one-way function, an intermediate output using only two different inputs comprising the stored first secret and a challenge generated by the random number generator, calculate, with a fourth one-way function, an output using only two other inputs comprising the stored second secret and the intermediate output; and extract an authentication response from the output.

17. A subscriber identity module, comprising:

a memory configured to store a subscriber key defined for a subscriber and an operator parameter defined for an operator associated with the subscriber, the operator parameter being an operator-specific parameter, a value of which has been selected by the operator; and a processor configured to:

calculate, with a first one-way function, a first secret from only two inputs comprising the stored subscriber key and the stored operator parameter;

calculate, with a second one-way function, an output from only two different inputs comprising the first secret and a received challenge; and extract, from the output, an authentication response used in authentication.

18. A subscriber [identify] *identity* module, comprising:

a memory configured to store a first secret calculated with a first one-way function from only two inputs comprising a subscriber key defined for a subscriber and an operator parameter defined for an operator associated with the subscriber, the operator parameter being an operator specific parameter, a value of which has been selected by the operator; and a processor configured to:

calculate, with a second one-way function, an output from only two different inputs comprising the stored first secret and a received challenge; and extract, from the output, an authentication response used in authentication.

19. A subscriber identity module, comprising a memory configured to store a [subscriber key defined for a subscriber and an operator parameter defined for an operator associated with the subscriber, the operator parameter being an operator-specific parameter, a value of which has been selected by the operator] *first secret calculated with a first one-way function from only two inputs comprising a subscriber key defined for a subscriber and an operator parameter defined for an operator associated with the subscriber, the operator parameter being an operator specific parameter, a value of which has been selected by the operator*, and a processor configured to:

[calculate, with a first one-way function, a first secret from only two inputs comprising the stored subscriber key and the stored operator parameter;]

calculate, with a second one-way function, a second secret from said two inputs;

calculate, with a third one-way function, an intermediate output from only two different inputs comprising the first secret and a received challenge;

calculate, with a fourth one-way function, an output from only two other inputs comprising the second secret and the intermediate output; and extract, from the output, an authentication response used in authentication.

20. A subscriber identity module, comprising:

a memory configured to store:

a first secret calculated with a first one-way function from only two inputs comprising a subscriber key defined for a subscriber and an operator parameter defined for an operator associated with the subscriber, the operator parameter being an operator-specific parameter, a value of which has been selected by the operator, and a second secret calculated with a second one-way function from said two inputs;

a processor configured to:

calculate, with a third one-way function, an intermediate output from only two different inputs comprising a random number challenge and the stored first secret;

calculate, with a fourth one-way function, an output from only two other inputs comprising the intermediate output and the stored second secret; and extract an authentication response from the output.

21. A method, comprising:

[calculating] *providing* a first secret *calculated* with a hash function using only two inputs comprising a predefined key and a predefined operator parameter, the key being predefined for a subscriber and the operator parameter being predefined as an operator-specific parameter, a value of which has been selected by the operator*, the first secret being stored in a subscriber identity module*;

[storing the first secret in a subscriber identify module;]

calculating, during authentication in the subscriber identity module, an output with an encryption algorithm using only two different inputs comprising a random number challenge and the stored first secret;

extracting an authentication response from the output; and authenticating the subscriber with the authentication response.

22. A method comprising:

masking a predefined key and a predefined operator parameter with a first mask, the key being predefined for a subscriber and the parameter being predefined for an operator associated with the subscriber as an operator-specific parameter, a value of which has been selected by the operator;

calculating, with a first one-way function, a first secret from only two inputs comprising the masked key and the masked operator parameter;

masking the key and the operator parameter with a second mask;

calculating, with a second one-way function, a second secret using only two different inputs comprising the key masked with the second mask and the parameter masked with the second mask;

storing the first and the second secret in a subscriber identity module;

generating a random number challenge used in authentication of the subscriber;

calculating, in the subscriber identity module during authentication, an intermediate output with a third one-way function using only two further inputs comprising the challenge and the stored first secret;

calculating, in the subscriber identity module during authentication, an output with a fourth one-way function using only two additional inputs comprising the intermediate output and the stored second secret;

extracting an authentication response from the output; and authenticating the subscriber with the authentication response.

23. A *non-transitory* memory embodying program instructions therein executable by a processor operably coupled to the memory which, when executed by the processor, carry out the functions of:

calculating a first secret with a first one-way function from only two inputs, the two inputs for the first one-way function comprising a predefined key and a predefined parameter, the predefined key being predefined for a subscriber and the predefined parameter being predefined for an operator associated with the subscriber as an operator-specific parameter, a value of which has been selected by the operator;

calculating an output with a second one-way function using only two different inputs, the two different inputs for the second one-way function comprising a challenge and the calculated first secret, the challenge being a random number generated for use in authentication; and extracting an authentication response from the output.

24. A *non-transitory* memory embodying program instructions therein executable by a *processor* operably coupled to the memory which, when executed by the processor, carry out the functions of:

calculating with a first one-way function a first secret from only two inputs comprising a predefined key and a predefined operator parameter, the key being defined for a subscriber and the operator parameter being defined for an operator associated with the subscriber as an operator-specific parameter, a value of which has been selected by the operator;

calculating with a second one-way function a second secret using only two different inputs comprising the key and the operator parameter;

calculating with a third one-way function an intermediate output using only two additional inputs comprising a random number challenge and the first secret;

calculating with a fourth one-way function an output using only two other inputs comprising the intermediate output and the second secret; and extracting an authentication response from the output.

25. A *non-transitory* memory embodying program instructions therein executable by a processor operably coupled to the memory which, when executed by the processor, carry out the functions of:

masking a predefined key and a predefined operator parameter with a first mask, the key being defined for a subscriber and the operator parameter being for an operator associated with the subscriber as an operator-specific parameter a value of which has been selected by the operator;

calculating with a first one-way function a first secret from only two inputs comprising the masked key and the masked parameter;

masking the key and the operator parameter with a second mask;

calculating with a second one-way function a second secret using only two different inputs comprising the key masked with the second mask and the operator parameter masked with the second mask;

calculating, during authentication, an intermediate output with a third one-way function using only two further inputs comprising a random number challenge and the first secret;

calculating, during authentication, an output with a fourth one-way function using only two additional inputs comprising the intermediate output and the second secret; and extracting an authentication response from the output.

26. A *non-transitory* memory embodying program instructions therein executable by a processor operably coupled to the memory which, when executed by the processor, carry out the functions of:

calculating, during authentication, an intermediate output with a first one-way function from only two inputs comprising a challenge and a first secret, the first secret being pre-calculated with a second one-way function using only two different inputs comprising a subscriber key masked with a first mask and an operator parameter masked with the first mask, the key being predefined for a subscriber and the operator parameter being predefined for an operator associated with the subscriber as an operator-specific parameter, a value of which has been selected by the operator;

calculating, during authentication, an output with a third one-way function using only two further inputs comprising the intermediate output and a second secret, the second secret being precalculated with a fourth one-way function using only two other inputs comprising the key masked with a second mask and the operator parameter masked with the second mask; and extracting an authentication response from the output.

27. The method of claim 1, further comprising using a new challenge in each subsequent authentication of the subscriber, wherein the same key and the same operator parameter may be used in subsequent authentications of the subscriber.

28. The method of claim 1, further comprising reusing the operator parameter for all subscribers associated with the operator.

*29. A mobile station, comprising:*

*a receiver configured to receive an authentication challenge from a network via a radio connection and to provide the authentication challenge to a subscriber identification module;*

*a transmitter configured to transmit an authentication response, provided from the subscriber identification module, to the network via the radio connection, the authentication response being derived in accordance with predetermined functions and at least one secret that comprise:*

*a first secret derived by a first one-way function from only two inputs comprising a subscriber key defined for a subscriber and an operator parameter defined for an operator that is associated with the subscriber, the operator parameter being an operator specific parameter, a value of which has been selected by the operator; and*

*a second one-way function used to calculate, from only two different inputs comprising the first secret and the received challenge, the authentication response.*

*30. The mobile station of claim 29, where the subscriber identification module comprises part of the mobile station.*

*31. The mobile station of claim 29, where the second one-way function is used to calculate a second secret from said two different inputs.*

* * * * *

UNITED STATES PATENT AND TRADEMARK OFFICE

CERTIFICATE OF CORRECTION

PATENT NO. : RE45,873 E
APPLICATION NO. : 14/700536
DATED : January 26, 2016
INVENTOR(S) : Kaisa Nyberg It is certified that error appears in the above-identified patent and that said Letters Patent is hereby corrected as shown below:

In the Claims

In Claim 11:
Column 11, line 24, “an” should be deleted and --[an] the-- should be inserted.

In Claim 14:
Column 12, line 19, “Au” should be deleted and --An-- should be inserted.

In Claim 15:
Column 12, line 45, “second-way” should be deleted and --second one-way-- should be inserted.

Signed and Sealed this
Seventeenth Day of May, 2016

Michelle K. Lee

Michelle K. Lee
*Director of the United States Patent and Trademark Office*